(12) United States Patent
Soliman (10) Patent No.: US 11,921,017 B2
(45) Date of Patent: Mar. 5, 2024

(54) STATIONARY MULTI-PHASE SAMPLING COLLECTION WITH AUTOMATIC CLEANING AND MINIMUM WASTE

(71) Applicant: Saudi Arabian Oil Company, Dhahran (SA)

(72) Inventor: Mohamed Soliman, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 343 days.

(21) Appl. No.: 17/444,976

(22) Filed: Aug. 12, 2021

(65) Prior Publication Data

US 2023/0053022 A1 Feb. 16, 2023

(51) Int. Cl.
*G01N 1/20* (2006.01)
*G01N 1/22* (2006.01)

(52) U.S. Cl.
CPC ......... *G01N 1/2035* (2013.01); *G01N 1/2247* (2013.01); *G01N 2001/205* (2013.01); *G01N 2001/2267* (2013.01)

(58) Field of Classification Search
CPC ............... G01N 1/2035; G01N 1/2247; G01N 2001/205; G01N 2001/2267; G01N 30/20; G01N 2030/201; G01N 2030/202; G01N 2030/385; F16K 1/14; F16K 15/04; F16K 11/056; F16K 15/048; F16K 15/1823; F16K 15/1843; F16K 31/0631; F16K 31/0637

(Continued)

(56) References Cited

U.S. PATENT DOCUMENTS

| 2,955,922 A | 10/1960 | Christy |
| 4,470,316 A | 9/1984 | Jiskoot |

(Continued)

FOREIGN PATENT DOCUMENTS

| CN | 212483485 U | 2/2021 |
| GB | 2346672 A | 8/2000 |

(Continued)

OTHER PUBLICATIONS

Saudi Aramco; SABP-A-109 Sampling Point Design; Jan. 20, 2020.

(Continued)

*Primary Examiner* — John Fitzgerald
*Assistant Examiner* — Truong D Phan
(74) *Attorney, Agent, or Firm* — Leason Ellis LLP (57) ABSTRACT

A multi-phase sampling collection system includes a three-way four-port valve unit that includes a valve housing having a first port, a second port opposite the first port, and a third port. The valve unit includes an inner valve member that is movably disposed within the valve housing between a plurality of positions. The inner valve member has a main valve body that has a first valve opening, a second valve opening opposite the first valve opening, a third valve opening and a fourth valve opening opposite the third valve opening. The third valve opening is defined by a plurality of orifices for mixing incoming non-homogenous fluid to generate a mixed homogenous fluid and the fourth valve opening has a lesser diameter that the third valve opening for increasing fluid pressure drop, fluid velocity, and fluid turbulence resulting in improved mixing of the non-homogenous fluid that exits through the fourth valve opening.

20 Claims, 8 Drawing Sheets

(58) Field of Classification Search
USPC ......... 73/61.56, 220, 861.82, 249, 265, 271, 73/863.72, 863.86
See application file for complete search history.

(56) References Cited

U.S. PATENT DOCUMENTS

| | | | |
|---|---|---|---|
| 4,494,413 A | 1/1985 | Bukkems et al. | |
| 4,776,210 A | 10/1988 | Baillie et al. | |
| 4,836,017 A | 6/1989 | Bozek | |
| 4,872,316 A | 10/1989 | Browne et al. | |
| 5,688,402 A * | 11/1997 | Green | B01D 29/036 210/415 |
| 7,343,933 B2 | 3/2008 | McBeth et al. | |
| 8,109,158 B2 | 2/2012 | Guieze et al. | |
| 10,114,002 B2 | 10/2018 | Trefiak et al. | |
| 10,345,220 B1 | 7/2019 | Auffinger et al. | |
| 10,416,015 B2 | 9/2019 | Xie et al. | |
| 10,954,783 B2 | 3/2021 | Gosney et al. | |
| 2018/0372231 A1* | 12/2018 | Maichel | F16K 3/0263 |
| 2020/0317499 A1* | 10/2020 | Hays | B67D 1/1245 |
| 2020/0408067 A1 | 12/2020 | Mudigere et al. | |

FOREIGN PATENT DOCUMENTS

| | | | |
|---|---|---|---|
| JP | 2015014307 A | * | 1/2015 |
| WO | 2012112024 A1 | | 2/2012 |

OTHER PUBLICATIONS

Saudi Aramco; Gas Oil Separation Plant Engineering Encyclopedia.
Saudi Aramco; Gas Oil Separation Plant Standard SAES-A-010; Sep. 21, 2020.

* cited by examiner

STATIONARY MULTI-PHASE SAMPLING COLLECTION WITH AUTOMATIC CLEANING AND MINIMUM WASTE

TECHNICAL FIELD

The present application is generally directed to the sampling of fluids and more particularly, relates to multi-phase (e.g., three-phase) crude oil sampling system that minimizes the waste associated with such sampling and is provided in a number of configurations.

BACKGROUND

In a number of industries and for various reasons it may be necessary to take representative samples of non-homogeneous fluids in order to determine the concentration of the constituents (components) in the fluids. The sampling of a fluid is normally combined with the transport of the fluid through a pipeline which is one of the most important transporting means in many industries handling large quantities of fluids.

One industry in which the sampling of fluids is important is the oil industry. Sampling of crude oil for determining the net amount of oil has to be performed very accurately in connection with the metering of crude oil for business reasons, such as royalty purposes. The knowledge of the correct amount of hydrocarbons in the available crude oil will further enable refinery operation management to draw up more accurate mass balances so that the various refinery operations may be carried out in the most efficient manner.

One conventional method for continuously sampling crude oil to determine the amount of water and bottom sediments in the crude oil involves the step of passing the crude oil through a mixing zone in a pipeline to homogenize the crude oil. A fluid stream is continuously withdrawn from the homogenized crude oil and introduced into a collecting vessel. The collected fluid is mixed for homogenization, whereafter a sample is taken from the fluid for analysis.

As a result, there are many different methods for sampling fluids; however, they all suffer from a number of disadvantages. Often times, a traditional sampling method depends on using a static mixer to mix the fluid before withdrawal or withdraw the sample downstream any device that create turbulent flow. This method works very well at high fluid velocity but will not work during turndown or low velocity (laminar flow). In addition, traditional sampling methods also depend on releasing the gas and remaining of the sampling to atmosphere which present a risk for crude/fluid containing toxic components, such as H2S.

There is therefore a need for providing an improved mixing and sampling system that overcomes the deficiencies associated with the prior art.

SUMMARY

A multi-phase sampling collection system includes a three-way four-port valve unit that includes a valve housing having a first port, a second port opposite the first port, and a third port. The valve unit includes an inner valve member that is movably disposed within the valve housing between a plurality of positions. The inner valve member has a main valve body that has a first valve opening, a second valve opening opposite the first valve opening, a third valve opening and a fourth valve opening opposite the third valve opening. The third valve opening is defined by a plurality of orifices for mixing incoming non-homogenous fluid to generate a mixed homogenous fluid and the fourth valve opening has a lesser diameter that the third valve opening for increasing fluid pressure drop, fluid velocity, and fluid turbulence resulting in improved mixing of the non-homogenous fluid that exits through the fourth valve opening.

A method of collecting a sample from a non-homogenous fluid that is flowing through a pipeline comprises the steps of:
delivering the non-homogenous fluid to a three-way four-port valve unit that comprises:
a valve housing and an inner valve member that is movably disposed within the valve housing between a plurality of positions, the inner valve member having a main valve body that has a first valve opening, a second valve opening opposite the first valve opening, a third valve opening and a fourth valve opening opposite the third valve opening; wherein the non-homogenous fluid flows into the third valve opening which is defined by a plurality of orifices that cause mixing of the non-homogenous fluid to generate a mixed homogenous fluid and the fourth valve opening has a lesser diameter that the third valve opening for increasing fluid pressure drop, fluid velocity, and fluid turbulence resulting in improved mixing of the non-homogenous fluid that exits through the fourth valve opening;
taking a sample of the mixed homogeneous fluid; and
reinjecting sampling waste back into the pipeline.

DETAILED DESCRIPTION OF CERTAIN EMBODIMENT

The present disclosure is directed to an integrated stationary sampling system to collect representative sample from single or multi-phase hydrocarbon systems and pipelines with no or essentially no release of toxic vapor and liquid waste such as H2S (waste gas) to atmosphere. The process and apparatus are provided for intermittent sampling, for example, multi-phase crude oil, wherein the crude oil is passed through a unique three-way four-port mixing ball valve in a pipeline where two ports with orifice type with multi opening to create pressure drop to homogenize the crude oil, a fluid stream is then continuously withdrawn from the homogenized crude oil and introduced into a collecting vessel. The waste gas will be automatically returned after the second port. The sample is taken for analysis at designated laboratories. The sampling system will integrate the optimum location of collecting the sample with innovative sampling collection design. The present system addresses and overcomes the shortfalls of the current sampling installations by performing the following operations: (1) collecting representative sample using the innovative mixing valve; (2) minimizing the risk of personnel exposure to toxic fluids like H2S gas during sampling; (3) minimizing the incidents occurs as a result of taking samples from unsafe drains and vents; (4) providing proper means of monitoring the crude production specifications and wells performance; (5) collecting the right sample mixture and ensure adequate phase mixing before collecting the samples; and (6) minimizing waste.

As described herein, the present system and method utilize an innovative three-way, four-port valve that ensure the homogenization of the three-phase fluid before taking the samples especially during the turndown. Slightly closing the valve will provide the required fluid mixing to get representative sample. In this invention, the three-way four-port valve is used to provide adequate mixing that must be available in the pipeline to ensure that a homogenous distribution of oil, water, gas, etc. exists across the line at the sampling location.

In accordance with one aspect of the present disclosure, the multi-phase sampling collection system includes a valve unit 200 as illustrated in the figures. In the illustrated embodiment, the valve unit 200 is a three-way, four-port valve that has a valve housing 210. The valve housing 210 can be thought of as having a top 212, an opposite bottom 214, a first side 216, an opposite second side 218, a third side 220 and an opposite fourth side 222. The first side 216 and second side 218 comprise a first pair of opposite sides and the third side 220 and the fourth side 222 comprise a second pair of opposite sides. The four sides 216, 218, 220, 222 are oriented 90 degrees apart from one another. The ports and flow paths can thus be thought of as being T-shape.

The valve housing is constructed such that it includes a first port 230 formed along the first side 216; a second port 240 is formed along the second side 218; and a third port 250 is formed along the third side 220. These ports 230, 240, 250 define different flow paths that are described herein. In the illustrated embodiment, the ports 230, 240, 250 have circular shapes; however, it will be appreciated that the ports 230, 240, 250 can have other cross-sectional shapes. It will be appreciated that a fourth port can be provided along the fourth side 222; however, as shown, the valve housing 210 is intended to have a main axial flow path defined by the opposing first and second ports 230, 240 and a sampling port (third port 250) that is along an axis perpendicular to but in communication with the main axial flow path.

The valve housing 210 is a hollow structure in that the ports 230, 240, 250 all open into the hollow interior. Both the top 212 and the bottom 214 of the valve housing 210 do not contain ports that permit fluid flow. Instead, the top 212 and bottom 214 accommodate valve operating parts as described herein. The top 212 and bottom 214 are opposite one another as mentioned and are oriented 90 degrees from the other ports. The housing 210 can thus be a six-faced structure. During one exemplary mode of operation, the bottom 214 is oriented at a 6 o'clock position and the top is thus oriented at the 12 o'clock position.

The valve housing 210 can be formed of any number of suitable materials including suitable metals. As shown, one or more of the ports 230, 240, 250 can have flanges 201 that surround the respective openings and are configured to permit conduit members, such as pipes or the like, to be fluidly coupled thereto in a sealed manner. For example, the pipe end can include a complementary flange that seats against the flange 201 at one port and fasteners, such as bolts, can be used to attach the pipe to one side (face) of the valve housing 210. The valve housing 210 can have other structures and features that permit the valve housing 210 to be fluidly connected to surrounding structures (external equipment).

In one embodiment, the three ports 230, 240, 250 defined within the housing 210 have the same cross-sectional sizes; however, they can have different sizes.

The valve unit 200 also includes a movable inner valve member 300. The inner valve member 300 is disposed within the hollow interior of the housing 210 and can be moved between a plurality of different operating positions that define different flow paths for fluid that is flowing through conduit and is desired to be sampled.

The four-port design takes its name from the fact that there are four ports (four openings) as part of the inner valve member 300 as discussed below.

The inner valve member 300 can be in the form of a ball valve or similar valve that can be moved (rotated) within the hollow interior and positioned relative to the three ports 230, 240, 250 of the valve housing 210. The inner valve member 300, as illustrated, can have a main valve body 310 and a stem 320. The main valve body 310 can be considered to be a spherical plug that rotates about an axis that passes through the stem 320. The stem 320 has a top portion 322 that extends through and above the top 212 of the main housing 210. The top portion 322 is at least partially exposed and accessible and is for coupling to an actuator or the like that is configured to controllably rotate the main valve body 310. The top portion 322 of the stem 320 is attached to the top of the main valve body 210 but does not travel inside the main valve body 210. The stem 320 has a bottom portion 325 that lies below and extends from the bottom 214. The stem 320 is formed along an axis in that the top portion 322 and the bottom portion 325 are coaxial. The top portion 322 and the bottom portion 325 define the axis of rotation of the main valve body 210.

It will be understood that the stem 320 is sealingly coupled to the main housing 210 using traditional techniques, such as using bearings, seals, gaskets, etc.

The main valve body 310 is a hollow structure that permits fluid flow therethrough as discussed herein and complements the hollow main housing 210 to define the various fluid flow paths. The main valve body 310 includes a first valve face 312, an opposite second valve face 314, a third valve face 316 and an opposite fourth valve face 318. At the first valve face 312, there is a first valve opening 330; at the second valve face 314, there is a second valve opening 340; at the third valve face 316, there is a third valve opening 350; and at the fourth valve face 318, there is a fourth valve opening 360.

As discussed herein, the rotation of the main valve body 310 allows the strategic placement of selected valve openings relative to selected ports of the valve housing to define various flow paths. It will be appreciated that rotation of the main valve body 310 in 90 degree increments changes the positions of the valve openings relative to the ports and is used to define different flow paths and different flow characteristics. The actuator (e.g., motor) that is coupled to the stem 320 can thus be programmed to move in steps to incrementally rotate the main valve body 310 to the desired position within the housing 210. As described herein, the motor can be controlled remotely in an automated manner.

In one embodiment, the first valve opening 330 and the second valve opening 340 comprise full bore openings. More specifically, a full bore opening is an opening that is sized relative to the respective size of the port and also relative to the opening (diameter) of the conduit that carries the fluid to the valve unit 200. The full bore aspect refers to the fact that each of the first valve opening 330, the second valve opening 340, the first port 230, the second port 240 and the conduits that are in fluid communication with the first port 230 and the second port 240 have the same dimensions (e.g., diameter). In this way, the fluid flowing within the conduit flows in an unrestricted manner into the valve unit 200. In other words, the sizing of the valve openings and ports does not create a flow reduction nor flow expansion but is properly sized to maintain flow (e.g., maintain a desired flow rate) through the valve unit 200. In other words, the sizing of the first and second valve openings 330, 340 is selected to minimize pressure drop during operation.

The shapes and sizes of the first valve opening 330 and the second valve opening 340 are the same in the illustrated embodiment. For example, they can be circular in shape.

The third valve opening 350 and the fourth valve opening 360, in one embodiment, have different constructions than the first valve opening 330 and the second valve opening 340. In addition, the third and fourth valve openings 350, 360 each performs a different function than the first and second valve openings 350, 360 and more particularly, this set of valve openings acts as a means for homogenous mixing of the fluid and controlling the flow of the fluid. More specifically, the third valve opening 350 is intended to face the incoming fluid that is delivered to the valve unit 200 and is configured to create a homogenous mixture. As shown, the third valve opening 350 includes a plurality of orifices 352 for mixing the incoming non-homogenous fluid to generate a mixed homogenous fluid. The plurality of orifices 352 can be formed using any number of techniques, including but not limited to placing a perforated cover (screen (mesh)) over an opening formed in the main valve body. The underlying opening in the main valve body itself can be the same size as the first and second valve openings 330, 340; however, the inclusion of the perforated cover or the like over the opening in the main valve body reduces the open surface area of the valve opening since fluid can only flow through the plurality of orifices 352 into the hollow interior of the main valve body.

The orifices 352 can be formed in a uniform pattern (arrangement) as shown or can have other patterns. As shown, the orifices 352 can have the same shapes and sizes; however, in an alternative embodiment, at least some of the orifices 352 can have different shapes and/or sizes. As mentioned, the plurality of orifices 352 are designed to mix the incoming fluid since the incoming fluid contacts the perforated cover and flows into the orifices 352 in order to flow into the hollow interior of the main valve body. The mesh and orifice size will be determined based on the available pressure drop and targeted flow.

The opposite fourth valve opening 360 is designed to create sufficient pressure drop for the waste liquid and gas to rejoin the fluid in the main conduit (pipe) and consequently minimize the waste liquid and gas during sampling using single opening (as shown) or multiple openings as shown and as described herein. As illustrated, the fourth valve opening 360 has dimensions less than the third valve opening 350. For example, the fourth valve opening 360 has a diameter that is less than the other valve openings 330, 340, 350. There is no screen over the fourth valve opening 360 and therefore, the fluid can enter the main valve body through the third valve opening 350 and then exits through the fourth valve opening 360. Since the fourth valve opening 360 is smaller than the third valve opening 350, a pressure drop is generated at this location. As shown, the size (diameter) of the fourth valve opening 360 can be at least 50% the size (diameter) of the other valve openings 330, 340 or alternatively, the size can be at least 75%. The fourth valve opening is designed to provide enough differential pressure for the sampling loop to allow the fluid passes through the sampling loop and then rejoin downstream the orifice.

In one embodiment, both the third valve opening 350 and the fourth valve opening 360 can be characterized as being concaved shape.

As described herein, the valve unit 200 is configured to have a sampling mode of operation in that a multi-phase liquid, such as multi-phase crude oil, can be passed though the main valve body with the third and fourth valve openings 330, 340 are axially aligned with the incoming conduit and the outgoing conduit, respectively, to create fluid pressure drop to homogenize the multi-phase liquid (crude oil). As described below, in this sampling mode operation, a fluid stream is continuously withdrawn from the homogenized crude oil and introduced into a collecting vessel. The waste gas is automatically returned after the fourth valve opening 360. This sample is taken for analysis at designated laboratories, The sampling system integrates the optimum location of collecting the sample with innovative sampling collection design.

The present system addresses and overcomes the shortfalls of traditional sampling installation by: (1) collecting representative sampling using the valve unit 200; (2) minimizing the risk of personnel exposure to toxic fluids, like H2S gas during sampling; (3) minimizing the incidents that occur as a result of taking samples from unsafe drains and vents; (4) providing proper means of monitoring the crude production specifications and wells performance; (5) collecting the right sample mixture and ensure adequate phase mixing before collecting the samples; and (6) minimizing waste.

The construction of the third and fourth valve openings 350, 360 ensure the homogenization of the multi-phase fluid (e.g., three-phase fluid) before taking the samples especially during a turndown. Slightly closing the valve unit 200 provides the required fluid mixing to get a representative sample.

In one embodiment, the multi-phase fluid comprises a crude oil mixture of oil, water, gas, etc. and the present system including the valve unit 200 ensures that adequate mixing exits across the pipeline at the sampling location.

The other individual components of the multi-phase sampling collection system are described below.

Exemplary Modes of Operation

Configuration 1: Three-Phase Sampling for Pressurized Samples

Figure 1:
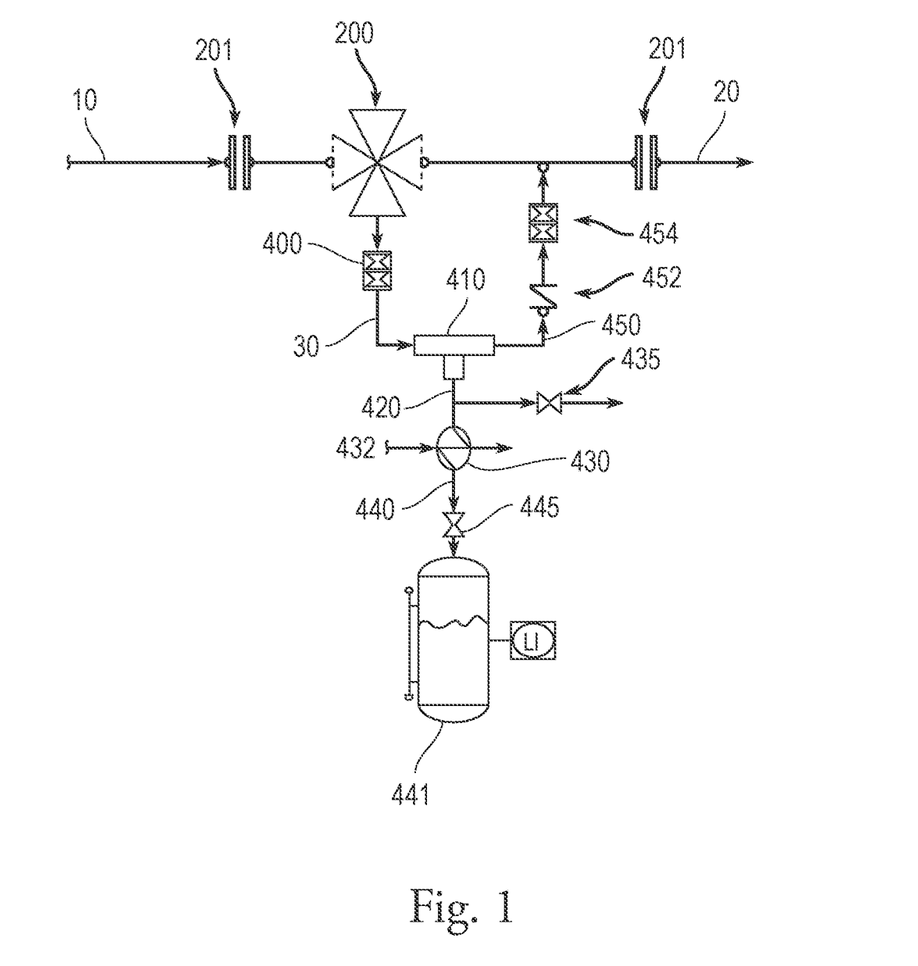
FIG. 1 is a schematic of a multi-phase sampling collection system in accordance with one embodiment illustrating three-phase sampling for pressurized samples.
Figure 2A:
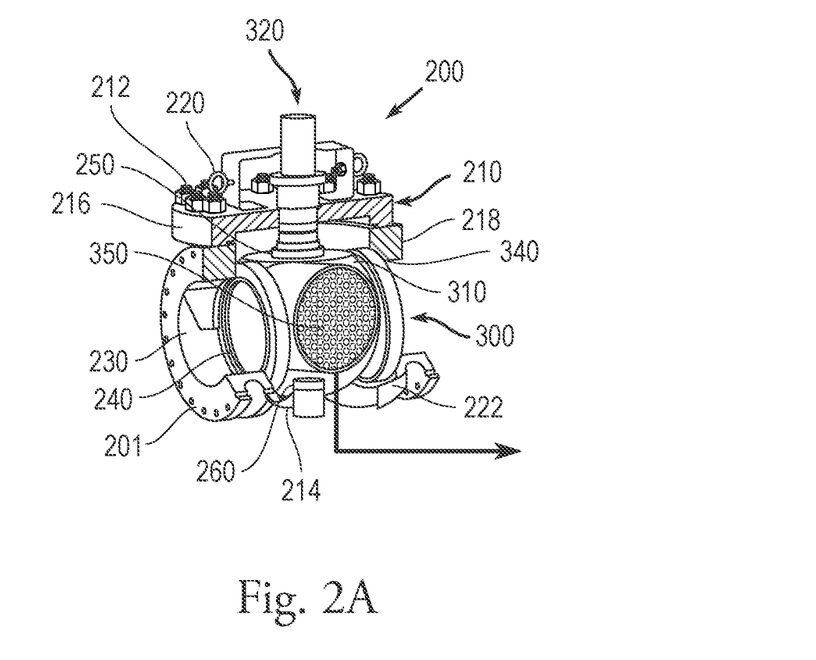
FIG. 2A is a side perspective view of a three-way, four-port mixing valve device (valve unit) in a non-sampling mode of operation.
Figure 2B:
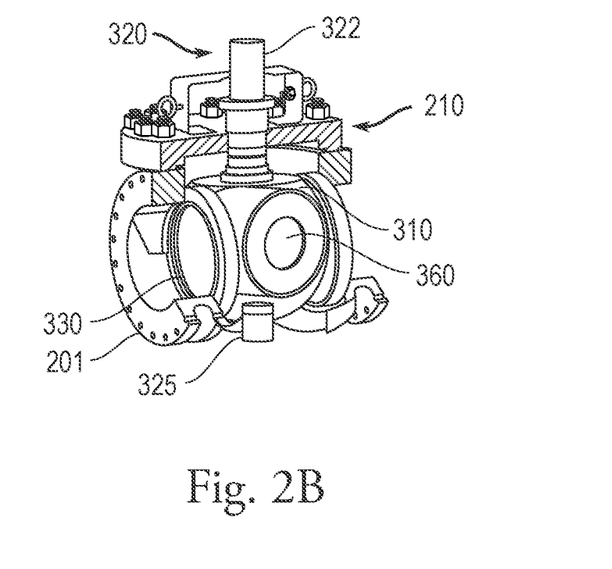
FIG. 2B is a side perspective view of a three-way, four-port mixing valve device (valve unit) in a non-sampling mode of operation.
Figure 3A:
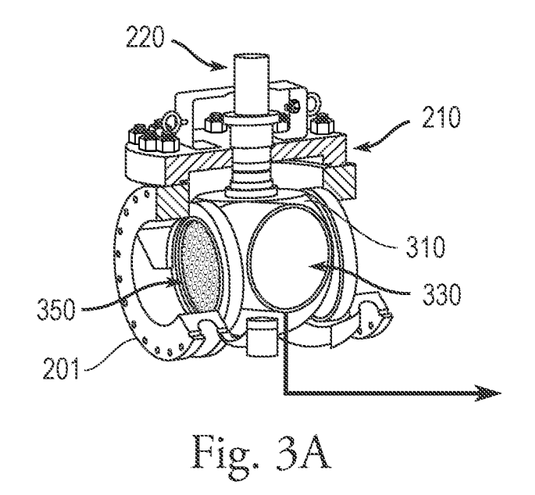
FIG. 3A is a side perspective view of a three-way, four-port mixing valve device (valve unit) in a sampling mode of operation.
Figure 3B:
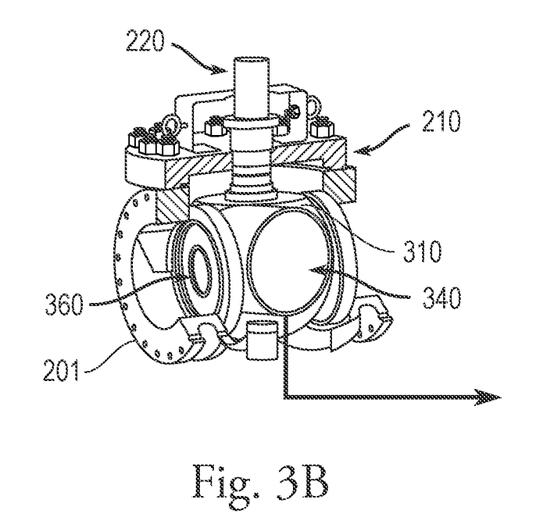
FIG. 3B is a side perspective view of a three-way, four-port mixing valve device (valve unit) in a sampling mode of operation.
Figure 4:
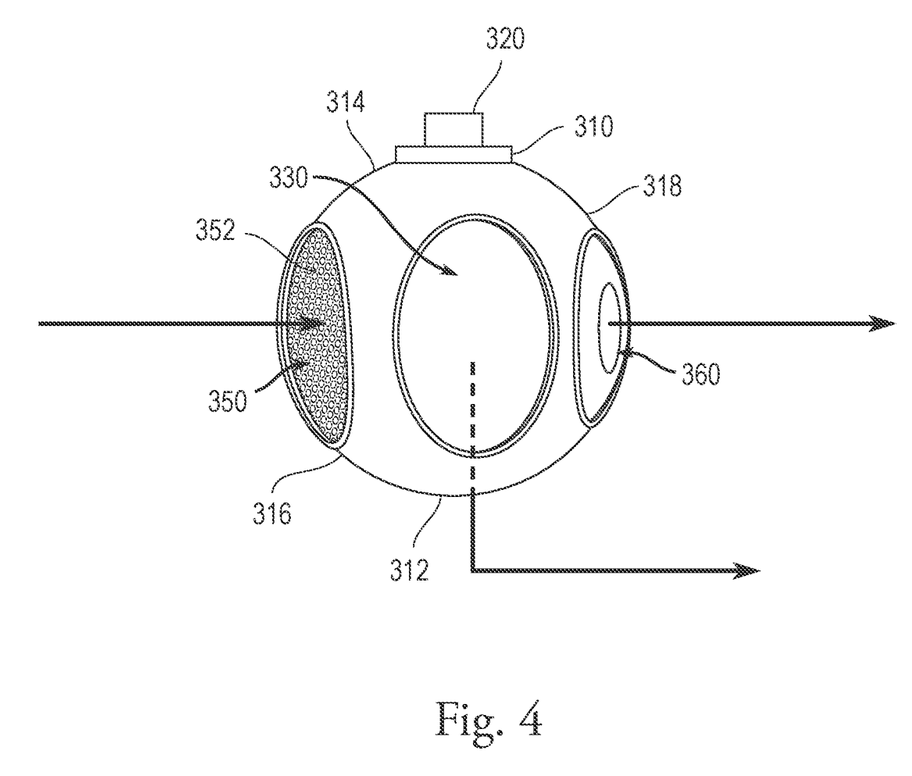
FIG. 4 is a side perspective view of a ball valve plug that forms part of the three-way, four-port mixing valve device.

In three-phase sampling, it is required to collect two-phase liquid (oil and water) into a pressurized container, while separating the gas after good mixing of the fluid. FIG. 1 shows this mode of operation. As shown, an inlet 10 in the form of an inlet conduit or inlet pipeline carries the three-phase fluid (oil, water and gas). FIG. 1 schematically shows the inlet flange of the inlet in sealed arrangement with a flange 201 of the valve unit 200 (e.g., the flange at the first port). Similarly, there is an outlet 20 in the form of an outlet conduit or outlet pipeline. An outlet flange of the outlet is in sealed arrangement with a flange of the valve unit 200 (e.g., the flange the second port). The outlet 20 leads to downstream processing equipment.

The system also includes a sampling conduit 30 that is in fluid communication with the valve unit 200. The sampling conduit 30 is the conduit that is fluidly connected to the valve unit 200 and receives the fluid that is to be sampled. In the illustrated embodiment, the sampling conduit 30 is in fluid communication with the third valve port 250 of the valve unit 200 and therefore, the sampling fluid that exits the main valve 200 flows through the third valve port 250 into the sampling conduit 30.

Within the sampling conduit 30, there is a first valve 400 that can move between open and closed positions. In the open position, the fluid can flow along the sampling conduit 30 to a downstream location at which equipment can be located as described herein. As shown in FIG. 1, the sampling conduit 30 can lead to an inline separator 410, such as an inline cyclic (cyclone) separator. As is known, a cyclone separator is a device for removing one or more components from a fluid system. In fluid communication with an exit port of the cyclone separator 410 is an exit conduit 420 that receives liquid from the cyclone separator 410 after it has been filtered. In other words, the filtrate that exits the cyclone separator 410 flows into the exit conduit 420. The exit conduit 420 can lead to a water cooler 430 that receives cooling water 432. In communication with the exit conduit 420, there is a vent valve 435 that leads to a safe location and can be a flare or drain line. The water cooler 430 also has an outlet conduit 440 that leads to a collection unit 441. The collection unit 441 can be in the form of a pressurized sample container that receives the fluid to be sampled. Within the outlet conduit 440 there can be a manual sampling valve 445. The manual sampling valve 445 can move between a closed position and an open position that allows fluid to flow directly into the sample container 441.

Fluidly coupled to the cyclone separator 410 is a return conduit 450 that returns back to the outlet 20. Within the return conduit 450 there can be a check valve or non-return valve 452 which has a specific purpose of protecting equipment from the consequences of reversed flow conditions. If the flow does reverse, the pressure of the fluid will help to keep non-return valve 452 closed. Downstream of the non-return valve 452 is a second valve 454 that moves between open and closed positions. In the open position, fluid can flow within the return conduit 450 to the outlet 20. The return conduit 450 thus allows fluid that is not sampled to be delivered from the cyclone separator 410 to the outlet 20.

To operate the system in this mode of operation, the inner valve member 300 is manipulated and positioned such that the main valve body 310 is rotated by its stem 320 to its mixing position in which the concave third valve opening 350 is axially aligned with and faces the incoming non-homogenous fluid in the inlet 10. This position results in the fourth valve opening 360 being positioned with the outlet 20.

As mentioned previously, the concave third valve opening 352 with its plurality of orifices 352 mix the incoming non-homogenous fluid for sample collection and the four valve opening 360 assists in sample collection by increasing the pressure drop, fluid velocity, fluid turbulence and therefore increase the mixing of the non-homogenous fluids.

The valves 400, 454 are opened for a predetermined period of time, such as 5 minutes, to clean and remove any fluids inside the stationary sampling station. In this step, stream of the mixed fluid exits the valve unit 200 through the second valve opening 340 and flows into the sampling conduit 30 to the inline cyclone separator 410 to separate any gasses from the mixed liquid.

Next, the manual sampling valve 445 is slowly opened to collect the pressurized non-homogenous liquid with no gas. The separated gas will go after the fourth valve opening 360 but before the outlet flange 201 that interfaces with outlet 20. The separated liquid from the inline cyclone separator 410 passes through the water cooler 430 to cool the liquid sample if necessary and then the separated liquid flows into the sample container 441, such as a collection drum or other structure. The level (volume) inside the pressurized sample container 441 is monitored until it reaches a target level, such as 100%.

Once the separated liquid is collected in the sample container 441, the inner valve member 300 is manipulated and positioned such that the main valve body 310 is rotated by its stem 320 to its normal, fully opened position in which the first valve opening 330 is axially aligned with and faces the incoming non-homogenous fluid in the inlet 10. This position results in the second valve opening 340 being positioned with the outlet 20. In this normal valve position, no mixing occurs since the third valve opening 350 is not aligned with the incoming non-homogenous fluid in the inlet 10. This position of the inner valve member 300 stops sample collection in the sample container 441. Instead, the incoming non-homogenous fluid flows axially through the valve housing from the inlet conduit to the outlet conduit.

Next the valves 400, 454 are closed.

Next, the sampling station is depressurized to a dedicated safe location. The step can involve a flaring and/or draining step. Once depressurization is completed, the pressurized sample container 441 can be brought to the laboratory for analysis of the sample.

Figure 5:
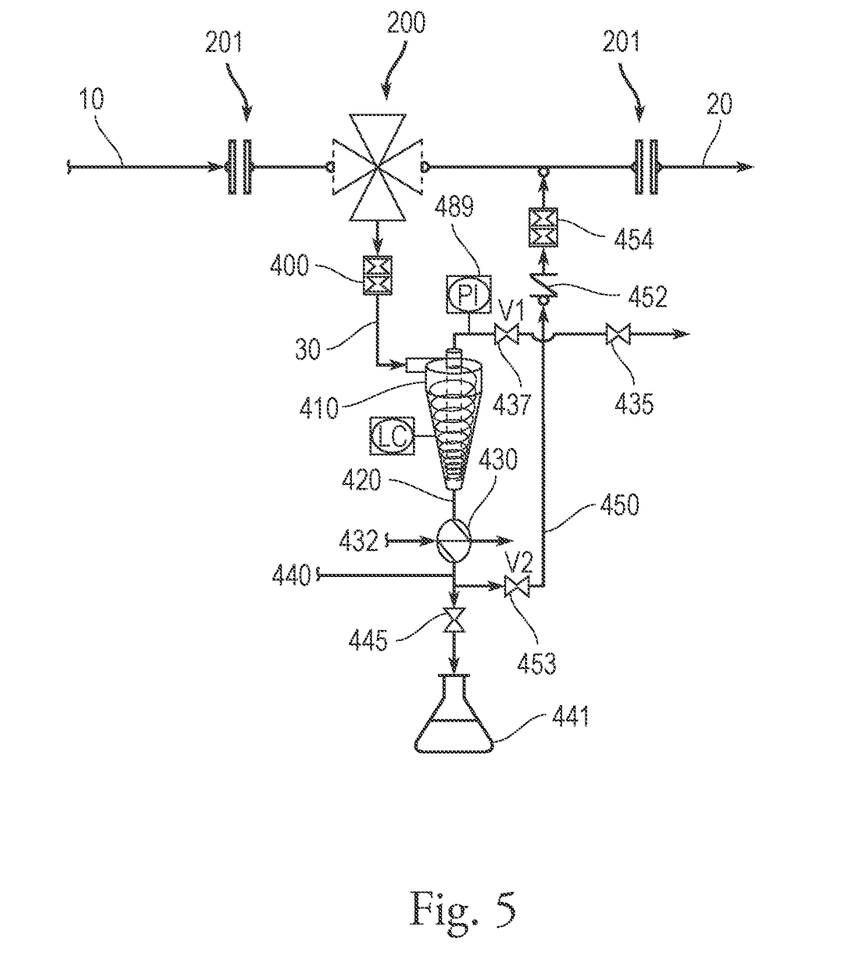
FIG. 5 is a schematic of a multi-phase sampling collection system in accordance with one embodiment illustrating three-phase sampling for atmospheric samples collection using a hydrocyclone separator.

Configuration 2: three-phase sampling for atmospheric samples collection using a hydrocyclone separator FIG. 5 shows a modified version of the sampling system of FIG. 1 and therefore, like elements are numbered alike. The main differences between the two systems are as follows. The return conduit 450 in FIG. 5 is located along the outlet conduit 440 between the cyclone separator 410 and the water cooler 430. The non-return valve 452 and the second valve 454 are located along the return conduit 450. In communication with the separator 410, there is a vent valve 435 that leads to a safe location and can be a flare or drain line.

Within the vent valve line and upstream of the vent valve 435, there can be an additional valve (V1) 437 and similarly, within the return valve 450 and upstream of the non-return valve 452, there can be an additional valve (V2) 453.

In this mode of operation (second configuration), the inner valve member 300 is manipulated and positioned such that the main valve body 310 is rotated by its stem 320 to its mixing position in which the concave third valve opening 350 is axially aligned with and faces the incoming non-homogenous fluid in the inlet 10. This position results in the fourth valve opening 360 being positioned with the outlet 20.

As mentioned previously, the concave third valve opening 350 with its plurality of orifices 352 mix the incoming non-homogenous fluid for sample collection and the fourth valve opening 360 assists in sample collection by increasing the pressure drop, fluid velocity, fluid turbulence and therefore increase the mixing of the non-homogenous fluids.

The manual sampling valve 445 is closed.

The valves 400, 454 are opened for a predetermined period of time, such as 5 minutes, to clean and remove any fluids inside the stationary sampling station. In this step, stream of the mixed fluid exits the valve unit 200 through the second valve opening 340 and flows into the sampling conduit 30 to the inline cyclone separator 410 to separate any gasses from the mixed liquid.

The separated gas is routed through the valve unit 200 to a location after the fourth valve opening 360 but before the outlet flange 201 that interfaces with outlet 20. It will be understood that the separated gas can be returned to the valve housing itself upstream of the flange 201 to have the full sampling system as one device, package or skid or it can be returned downstream of the flange 201.

The separated liquid from the inline cyclone separator 410 passes through the water cooler 430 to cool the liquid sample if necessary and then the separated liquid flows to the sample container 441 in a subsequent step described below.

The level (volume) inside the hydrocyclone (inline cyclone separator 410) is monitored until it reaches a target level, such as 100%.

The inner valve member 300 is manipulated and positioned such that the main valve body 310 is rotated by its stem 320 to its normal, fully opened position in which the first valve opening 330 is axially aligned with and faces the incoming non-homogenous fluid in the inlet 10. This position results in the second valve opening 340 being positioned with the outlet 20. In this normal valve position, no mixing occurs since the third valve opening 350 is not aligned with the incoming non-homogenous fluid in the inlet 10. This position of the inner valve member 300 stops sample collection.

Next the valves 400, 454 are closed.

The vent valve 435 is opened to depressurize the sampling station to a dedicated safe location as by performing flaring or draining the fluid.

The pressure in the inline cyclone separator 410 is monitored until the pressure reaches 0 psig. The pressure can be monitored using a pressure monitor (PI) 489.

Next, the manual sample valve 445 is opened and this results in the fluid sample being collected in the sample container 441. Once the fluid collection is complete, the manual sampling valve 445 is closed and the pressurized sample container 441 is collected and transported to the laboratory for testing.

Configuration 3: Three-Phase Sampling for Atmospheric Samples Collection Using a Hydrocyclone Separator and Collection Container (Drum)

Figure 6:
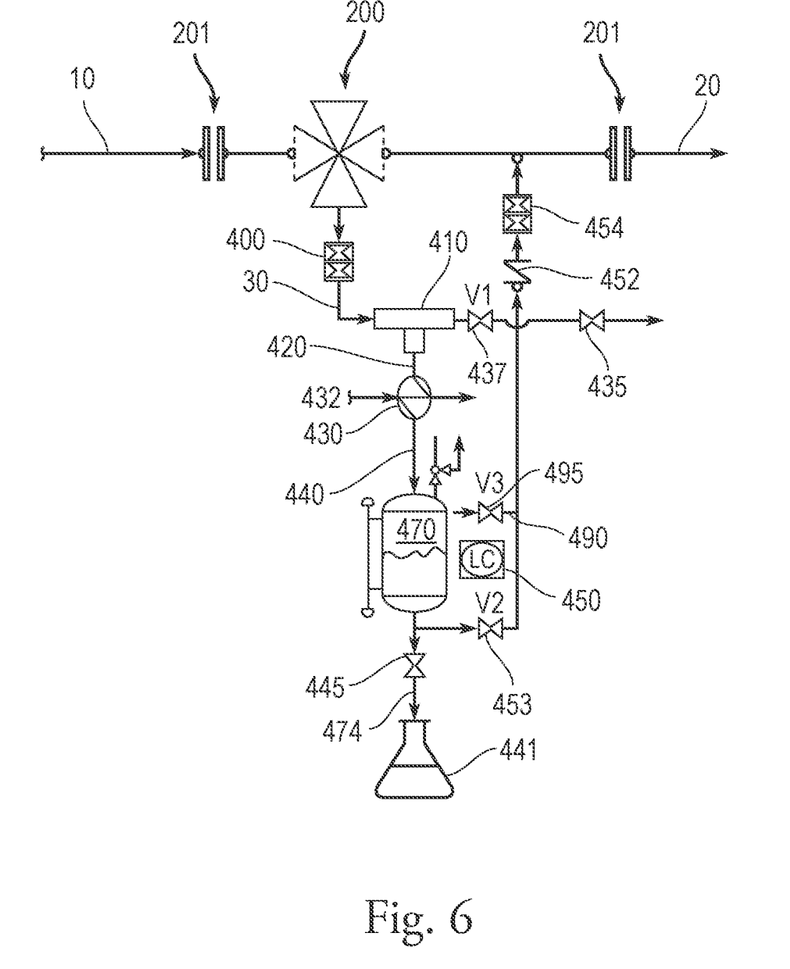
FIG. 6 is a schematic of a multi-phase sampling collection system in accordance with one embodiment illustrating three-phase sampling for atmospheric samples collection using a cyclonic separator and a collection drum.

This configuration is shown in FIG. 6.

Between the water cooler 430 and the sample container 441 there is a collection drum 470 that receives the cooled liquid from the water cooler 430. The collection drum 470 receives the cooled liquid through an inlet line (conduit 440) and can have a relief valve 472 that is designed to release pressure under certain conditions.

There is also a connector conduit 490 that fluidly connects the collection drum 470 and the return conduit 450. The outlet conduit 474 can be located at the bottom of the collection drum 470, while the connector conduit 490 can connect to the collection drum 470 at the top of the collection drum 470. Within the connector conduit 490 there is a valve (V3) 495.

In this mode of operation, the inner valve member 300 is manipulated and positioned such that the main valve body 310 is rotated by its stem 320 to its mixing position in which the concave third valve opening 350 is axially aligned with and faces the incoming non-homogenous fluid in the inlet 10. This position results in the fourth valve opening 360 being positioned with the outlet 20.

As mentioned previously, the concave third valve opening 352 with its plurality of orifices 352 mixes the incoming non-homogenous fluid for sample collection and the fourth valve opening 360 assists in sample collection by increasing the pressure drop, fluid velocity, fluid turbulence and therefore increase the mixing of the non-homogenous fluids.

The manual sampling valve 445 is closed.

The valves 400, 454 are opened for a predetermined period of time, such as 5 minutes, to clean and remove any fluids inside the stationary sampling station. In this step, a stream of the mixed fluid exits the valve unit 200 through the second valve opening 340 and flows into the sampling conduit 30 to the inline cyclone separator 410 to separate any gasses from the mixed liquid. Any gas will be recycled back to the main line (outlet 20) through the valve 454 and the liquid will be collected in the sample container 441.

The separated gas is routed through the valve unit 200 to a location that is after the fourth valve opening 360 but before the outlet flange 201 that interfaces with outlet 20. The separated liquid from the inline cyclone separator 410 passes through the water cooler 430 to cool the liquid sample if necessary and then the separated liquid flows to the sample container 441 in a subsequent step when the manual sampling valve 445 is opened as described below.

The level (volume) inside the sample container 441 is monitored until it reaches a target level, such as 100%.

The inner valve member 300 is manipulated and positioned such that the main valve body 310 is rotated by its stem 320 to its normal, fully opened position in which the first valve opening 330 is axially aligned with and faces the incoming non-homogenous fluid in the inlet 10. This position results in the second valve opening 340 being positioned with the outlet 20. In this normal valve position, no mixing occurs since the third valve opening 350 is not aligned with the incoming non-homogenous fluid in the inlet 10. This position of the inner valve member 300 stops sample collection.

Next the valves 400, 454 are closed.

The vent valve 435 is opened to depressurize the sampling station to a dedicated safe location as by performing flaring or draining the fluid.

The pressure in the sample container 441 is monitored until the pressure reaches 0 psig.

Next, the manual sampling valve 445 is opened and this results in the fluid sample being collected in the sample container 441. Once the fluid collection is complete, the manual sampling valve 445 is closed and the pressurized sample container 441 is collected and transported to the laboratory for testing.

Stationary Sampling with the Three-Way Four-Port Valve Unit 200

Figure 7:
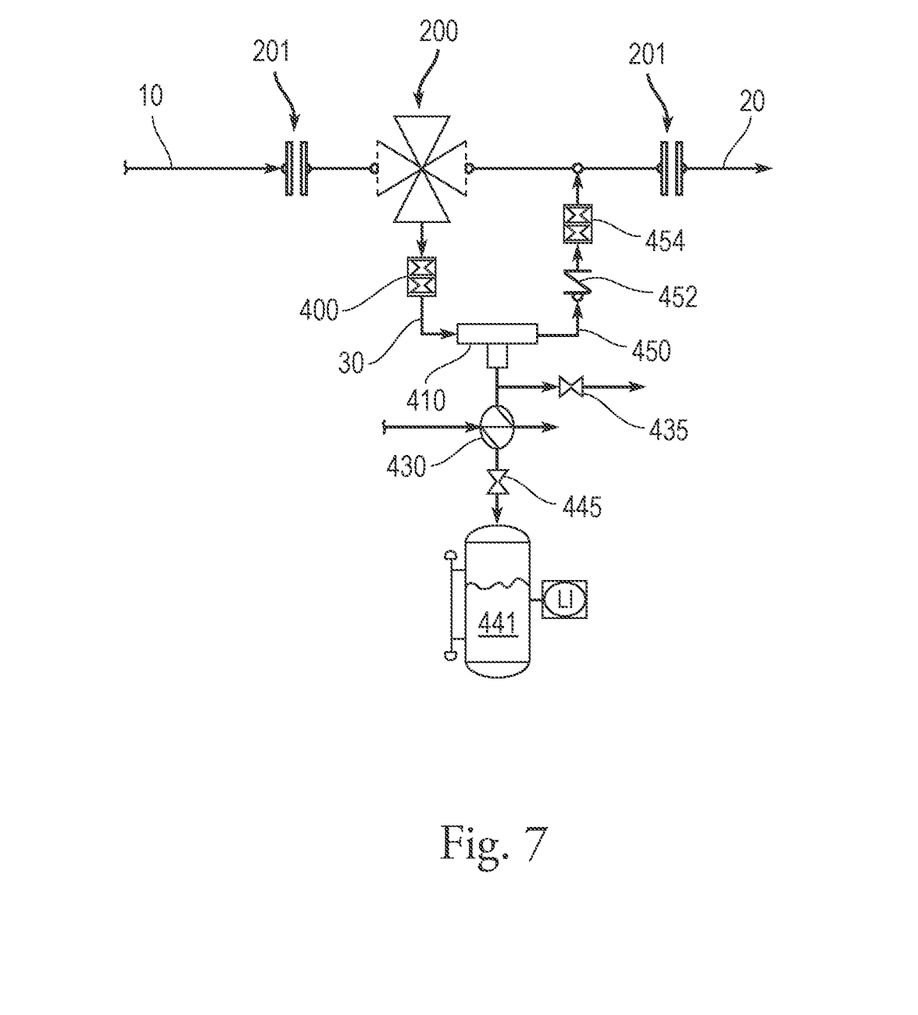
FIG. 7 is a schematic of a multi-phase sampling collection system in accordance with one embodiment illustrating stationary sampling with the three-way, four-port mixing valve device.

This configuration is shown in FIG. 7.

FIG. 7 illustrates an embodiment that allows for the collection of a pressurized sample in the pressurized sample container 441. This type of process is required for some analysis, condensate and gas sampling. It will be understood that the embodiment of FIG. 7 includes components previously described and therefore, like elements are numbered alike throughout the figures.

In this mode of operation, the inner valve member 300 of the valve unit 200 is manipulated and positioned such that the main valve body 310 is rotated by its stem 320 to its mixing position in which the concave third valve opening 350 is axially aligned with and faces the incoming non-homogenous fluid in the inlet 10. This position results in the fourth valve opening 360 being positioned with the outlet 20.

As mentioned previously, the concave third valve opening 352 with its plurality of orifices 352 mixes the incoming non-homogenous fluid for sample collection and the fourth valve opening 360 assists in sample collection by increasing the pressure drop, fluid velocity, fluid turbulence and therefore increase the mixing of the non-homogenous fluids.

Next, the valves 400, 454 are opened for five minutes to clean and remove any fluids inside the stationary sampling station. In this step, stream of the mixed fluid will be withdrawn to the inline cyclonic separator 410 to separate any gases from the liquid.

The manual sampling valve 445 is opened slowly to collect the pressurized non-homogeneous liquid with no gas present.

The separated gas will go after the fourth valve opening 360 in the valve unit 200 but before the outlet flange 201.

The pressure within the pressurized container 441 is monitored until the pressure reaches 100%.

The inner valve member 300 is manipulated and positioned such that the main valve body 310 is rotated by its stem 320 to its normal, fully opened position in which the first valve opening 330 is axially aligned with and faces the incoming non-homogenous fluid in the inlet 10. This position results in the second valve opening 340 being positioned with the outlet 20. In this normal valve position, no mixing occurs since the third valve opening 350 is not aligned with the incoming non-homogenous fluid in the inlet 10. This position of the inner valve member 300 stops sample collection.

Next, the valves 400, 454, 445 are closed.

The sampling station is depressurized to a dedicated safe location, to flare or to drain.

The pressurized sample container 441 is picked up and brough to the laboratory for testing.

Automated Sampling Mode of Operation

Figure 8:
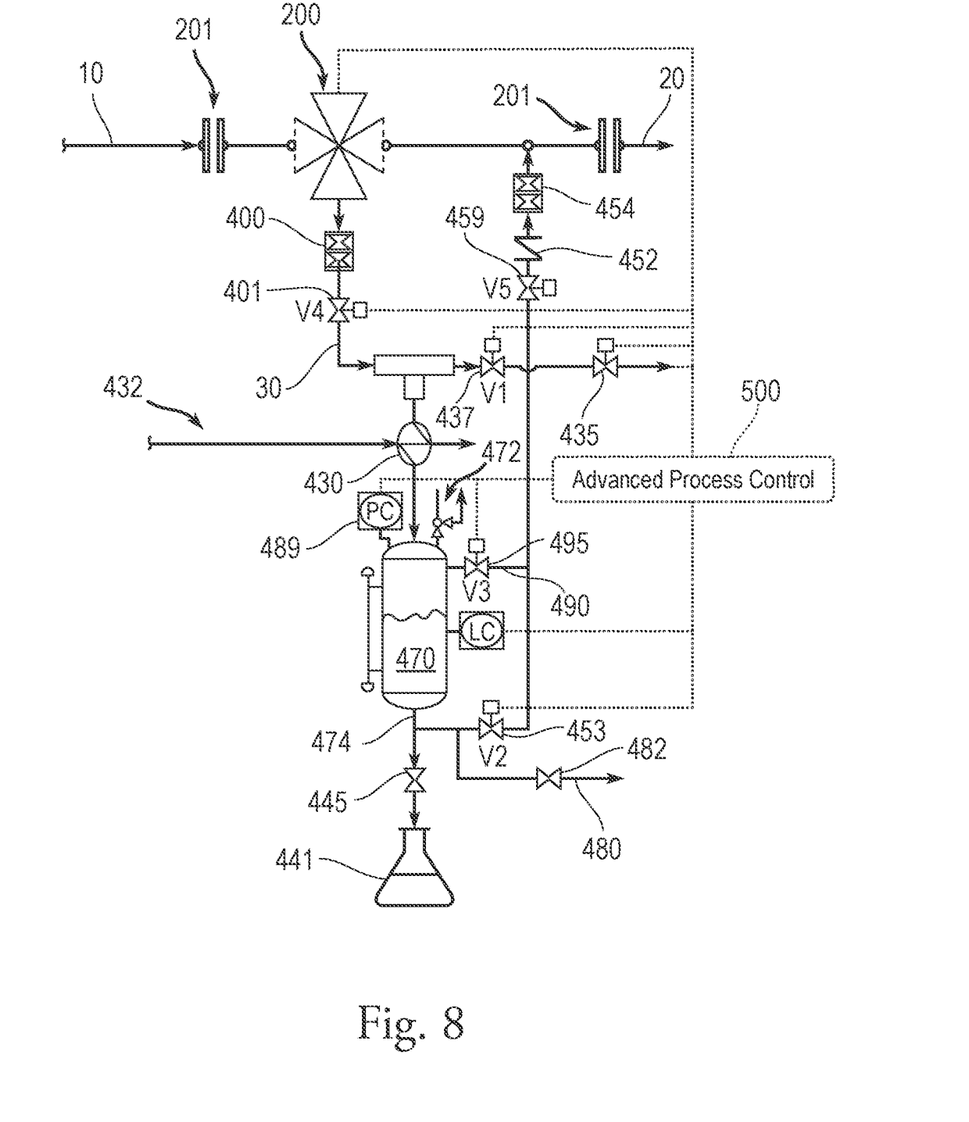
FIG. 8 is a schematic of a multi-phase sampling collection system in accordance with one embodiment illustrating an automated sampling process.

In another mode of operation, the sampling process can be automated and advanced process control can be used as schematically shown in FIG. 8. The automated sampling system shown in FIG. 8 is similar to the one shown in FIGS. 6-7 and therefore, like elements are numbered alike. The differences between the two are described below.

Within the sampling conduit 30, there is a valve (V4) 401 that is located between the valve 400 and the inline cyclone separator 410.

Between the water cooler 430 and the sample container 441 there is the collection drum 470 that receives the cooled liquid from the water cooler 430. The collection drum 470 receives the cooled liquid through an inlet line (conduit 440) and can have a relief valve 472 that is designed to release pressure under certain conditions.

Within the return conduit 450, there can be a drain line 480 that is located between the valve (V2) 453 and the outlet conduit 474 that is located between the collection drum 470 and the sample container 441. Within the drain line 480 there is a drain valve 482.

There is also a connector conduit 490 that fluidly connects the collection drum 470 and the return conduit 450. The outlet conduit 474 can be located at the bottom of the collection drum 470, while the connector conduit 490 can connect to the collection drum 470 at the top of the collection drum 470. Within the connector conduit 490 there is a valve (V3) 495.

A pressure monitor (PC) 489 is provided and configured to measure and monitor the pressure within the collection drum 470.

Along the return conduit 450, there is a valve (V5) 459 that is located between the valve (V2) 453 and the non-return valve 452. The valve (V5) 459 is located between the connector conduit 490 and the non-return valve 452.

The valves V1, V2, V3, V4, V5 are all operatively connected to an advanced process control unit 500 which allows for automated control over the operating states of these valves. In other words, the advanced control unit 500 can control whether each of these valves is either opened or closed.

In addition, the pressure monitor 489 is operatively connected to the advanced process control unit 500.

In FIG. 8, the lines between the advanced process control unit 500 and the other components indicate communication pathways between the advanced process control unit 500 and these other components, such as valves, measuring devices, etc.

The advanced process control unit 500 thus allows for full automation of the sampling process and can include a graphical user interface with a plurality of menus to allow operator input and selection. For example, the operator can select the type of sampling process that is being performed and then based on the selection, the user is prompted to begin the sampling process as by an actuator (button, switch, etc.) and then, the control unit 500 will follow the series of steps recited herein for a given specific sampling process in an automated manner. The operator can thus simply wait in a control room or the like away from the potentially dangerous area and the sampling process proceeds. When completed it will further be understood that a robotic arm or the like can retrieve the sample container and transport it to another location. Along the way, various readers can be provided to read (scan) the sampling container for identification and tracking purposes.

It will be appreciated that FIG. 8 shows advanced process control features for automating the sampling process. FIG. 6 depicts a manual process and FIG. 7 illustrates an automated collection process with minimum human interaction. This is very important for the collection of toxic gases, such as H2S. The automated sampling process can begin with the operator pressing a sampling button from the control panel and then a software program is followed for the given selected type of sampling. It will also be appreciated that this type of automation can be implemented in all of the systems described herein and illustrated in all of the figures (e.g., FIGS. 1, 5, 6 and 7) of the present application. In other words, the manual process steps are automated with the control system 500. The collection drum level controller LC 470 and the pressure controller PC 489 are used to monitor the hydrocarbon level and pressure and by following the sequence of openings and closing (manipulating) the valves 453, 495, 401, 459, 435, 437. This advanced process control step 500 is thus applicable to all previous figures.

Moreover, the valve unit 200 itself is operatively connected to the advanced process control unit 500 to permit remote control thereof in an automated manner. Thus, in one or more embodiments, the sampling collection system employs hardware and software that provide functionality to control operation of the various components of the system including valves and measuring devices. Computer programs (and other executable instructions) and data can be stored on a machine-readable medium that is accessible by one or more processors for providing functionality shown and described herein. Various forms of computing devices are accessible to a network and can communicate over the network to the various machines that are configured to send and receive content, data, as well as instructions that, when executed, enable operation of the valve unit 200. The content and data can include information in a variety of forms and can include embedded information such as links to other resources on the network, metadata, and/or machine executable instructions. Each computing device can be of conventional construction, and while discussion is made in regard to servers that provide different content and services to other devices, such as mobile computing devices, one or more of the server computing devices can comprise the same machine or can be spread across several machines in large scale implementations, as understood by persons having ordinary skill in the art. In relevant part, each computer server has one or more processors, a computer-readable memory that stores code that configures the processor to perform at least one function, and a communication port for connecting to the network. The code can comprise one or more programs, libraries, functions or routines which, for purposes of this specification, can be described in terms of a plurality of modules, residing in a representative code/instructions storage, that implement different parts of the process described herein. Further, computer programs (also referred to herein, generally, as computer control logic or computer readable program code) can be stored in a main and/or secondary memory and implemented by one or more processors (controllers, or the like) to cause the one or more processors to perform the functions of the invention as described herein. In this document, the terms "memory," "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

In this mode of operation, the manual sampling valve 445 is closed.

The inner valve member 300 is manipulated and positioned such that the main valve body 310 is rotated by its stem 320 to its mixing position in which the concave third valve opening 350 is axially aligned with and faces the incoming non-homogenous fluid in the inlet 10. This position results in the fourth valve opening 360 being positioned with the outlet 20.

As mentioned previously, the concave third valve opening 352 with its plurality of orifices 352 mixes the incoming non-homogenous fluid for sample collection and the fourth valve opening 360 assists in sample collection by increasing the pressure drop, fluid velocity, fluid turbulence and therefore increase the mixing of the non-homogenous fluids.

The valves 400, 454 are opened manually.

The sampling collection process is initiated according to the following steps (sequence).

Valves V1 (valve 437), V2 (valve 453), V3 (valve 495), V4(valve 401), and V5 (valve 459) are opened for a predetermined period of time, such as five minutes, to clean and remove any fluids inside the stationary sampling station. In this step, the fluid is withdrawn from the first valve opening 330 and the separated fluid goes back after the second valve opening 340 in the valve unit 200 but before the outlet flange 201. It will be appreciated that the separated fluid can be returned to the valve housing itself upstream of the flange 201 to have the full sampling system as one device, package or skid or it can be returned downstream of the flange 201.

After a period of time, such as five minutes, the valve V2 (valve 453) is closed. In this step, the stream of the mixed fluid will be withdrawn to cyclonic separator 410 to separate the gases if any from the liquid. Any gas is recycled back to the main line (outlet 20) through the valve 454 and the liquid is collected in the collection drum 470.

The separated liquid from the inline cyclonic separator 410 passes through the water cooler 430 to cool the liquid sample if necessary and then to the collection drum 470. The level (liquid level) inside the collection drum 470 is monitored until the liquid reaches the 100% level.

The inner valve member 300 is manipulated and positioned such that the main valve body 310 is rotated by its stem 320 to its normal, fully opened position in which the first valve opening 330 is axially aligned with and faces the incoming non-homogenous fluid in the inlet 10. This position results in the second valve opening 340 being positioned with the outlet 20. In this normal valve position, no mixing occurs since the third valve opening 350 is not aligned with the incoming non-homogenous fluid in the inlet 10. This position of the inner valve member 300 stops sample collection.

The valves V4 (valve 401), and V5 (valve 459) are automatically closed when the LC reaches 100%. In other words, the liquid level in the collection drum 470 is monitored with the liquid level monitor (LC) that is in communication with the advanced process control 500. Once the liquid level in the collection drum 470 reaches 100% as detected by the LC, the valves V4 and V5 close automatically under direction from the advanced process control 500. In other words, the advanced process control 500 receives a signal from the LC when the 100% level is reached and sends control signals to the valves V4 and V5 to cause them to automatically close.

The valves 400 and 454 are manually closed.

The vent valve 435 is opened to depressurize the sampling station to a dedicated safe location as by performing flaring or draining the fluid.

The pressure indicator (PC) 489 is monitored on the collection drum 470 until it reaches 0 psig.

The manual sampling valve 445 is open to collect the sample in the sample container 441.

The manual sampling valve 445 is then closed.

The manual drain valve 482 is opened to drain all liquid to the closed drain system.

Next, all valves are returned to the closed positions.

The pressurized sample container 441 can then be removed and delivered to the laboratory.

As described herein, the three-way four-port ball valve is configured to provide a mixing mode during sampling of the multi-phase non-homogenous fluid where the concaved orifice side (third valve opening 350) is facing the incoming fluid to create the desired mixing of the fluid (due to the perforated aspect and presence of orifices 352) and the construction of the fourth valve opening 360 provides the desired pressure drop in the fourth valve opening 360 to allow the separated gas from the sampling station to rejoin the main fluid that is flowing through the ball valve from the first valve opening 330 to the second valve opening 340. In other words, the present Applicant discovered that the optimal design of the three-way ball valve plug is to have four ports (the four valve openings 330, 340, 350, 360). Two of these ports are fullbore with the same size as the inlet and outlet pipes size to minimize pressure drop during operation. The second two ports are orifices where the first orifice (third valve opening 350) will be facing the incoming fluid and is designed to create homogeneous mixture using the plurality of openings 352. The second port (fourth valve opening 360) has a main function of creating enough pressure drop for the waste liquid and gas to rejoin the fluid in the main pipe and consequently minimize the waste liquid and gas during sampling using single opening or multiples as shown in the figures and discussed herein.

As a result of the aforementioned ball valve features, proper mixing is always provided before sampling withdrawal, as well as the sampling waste will be reinjected back into the main pipeline.

The present system thus discloses a three-way four-port position ball valve on the main crude line using the disclosed ball valve plug with two ports that have the same size as the main pipeline and the other two ports are orifices where the first orifice will have multi-opening to create adequate mixing and the second orifice has one opening or multiple to create differential pressure for the fluid return. The sample is withdrawn after the first concave orifice of the valve. The cyclonic separator is used to separate the gas and create additional pressure drop using the second concave orifice of the ball valve for the gas return to minimize toxic gas release. Sampling process can also be automated.

The sampling collection system described herein solves the following issues associated with prior systems:
1—Lack of representative samples;
2—Gas wastage during sampling;
3—Liquid wastage during sampling;
4—Toxic gas release to atmosphere like H2S;
5—Carcinogenic components release to atmosphere like BTEX;
6—Lack of proper samples and adequate mixing;
7—Gas and liquid waste during sampling;
8—Exposure to H2S during sampling; and
9—Lack of proper sampling stations to collect the samples to monitor well production or product specifications or equipment performance.

The present overcomes these deficiencies and provides the following features:
a. Collecting representative sample using the innovative mixing valve.
b. Minimizing the risk of personnel exposure to toxic fluids like H2S gas during sampling.
c. Minimizing the incidents occurs as a result of taking samples from unsafe drains and vents.
d. Providing proper means of monitoring the crude production specifications and wells performance.
e. Collecting the right sample mixture and ensure adequate phase mixing before collecting the samples.
f. Minimizing waste.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not precludes the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A multi-phase sampling collection system comprising:
a three-way four-port valve unit that comprises:
   a valve housing having a first port, a second port opposite the first port, and a third port; and
   an inner valve member that is movably disposed within the valve housing between a plurality of positions, the inner valve member having a main valve body that has a first valve opening, a second valve opening opposite the first valve opening, a third valve opening and a fourth valve opening opposite the third valve opening;
   wherein the third valve opening is defined by a plurality of orifices for mixing incoming non-homogenous fluid to generate a mixed homogenous fluid and the fourth valve opening has a lesser diameter that the third valve opening for increasing fluid pressure drop, fluid velocity, and fluid turbulence resulting in improved mixing of the non-homogenous fluid that exits through the fourth valve opening.

2. The multi-phase sampling collection system of claim 1, wherein the main valve body comprises a spherical ball valve.

3. The multi-phase sampling collection system of claim 1, wherein the plurality of orifices are formed in a screen element that is disposed across the first valve opening.

4. The multi-phase sampling collection system of claim 3, wherein the plurality of orifices are formed uniformly across the screen element.

5. The multi-phase sampling collection system of claim 1, wherein the first valve opening and second valve opening are disposed perpendicular to the third valve opening and the fourth valve opening.

6. The multi-phase sampling collection system of claim 1, wherein the first and second valve openings are completely open and have diameters that are greater than a diameter of the fourth valve opening.

7. The multi-phase sampling collection system of claim 6, wherein the diameters of the first valve opening and the second valve opening are the same.

8. The multi-phase sampling collection system of claim 1, wherein the first port receives the incoming non-homogenous fluid that is to be sampled and the non-homogenous fluid exits the second port, the third port comprising a sampling port through which a sample of the non-homogenous fluid is withdrawn from the three-way four-port valve unit.

9. The multi-phase sampling collection system of claim 1, further comprising:
   an inlet conduit in communication with the first port of the valve housing;
   an outlet conduit in communication with the second port of the valve housing;
   a sampling conduit in communication with the third port of the valve housing for selectively receiving the mixed homogenous fluid;
   an inline separator that receives the mixed homogenous fluid and is configured to separate any gases from the mixed homogenous fluid; and
   a sample container for receiving the mixed homogenous fluid from the inline separator after any gases have been removed.

10. The multi-phase sampling collection system of claim 9, wherein in a sampling mode of operation, the third valve opening of the main valve body is aligned with the first port of the valve housing; the fourth valve opening is aligned with the second port of the valve housing and one of the first and second valve openings is aligned with the third port of the valve housing; and wherein in a normal mode of operation, the first valve opening of the main valve body is aligned with the first port of the valve housing; the second valve opening is aligned with the second port of the valve housing and one of the third and fourth valve openings is aligned with the third port of the valve housing.

11. The multi-phase sampling collection system of claim 10, wherein the fourth valve opening is aligned with the third port of the valve housing in the normal mode of operation.

12. The multi-phase sampling collection system of claim 10, further including:
   a first valve located along the sampling conduit upstream of the inline separator;
   a collection drum located between the inline separator and the sample container for collecting the mixed homogenous fluid from the inline separator;
   a second valve located along a return line that has one end is in fluid communication with a conduit between the collection drum and the sample container and a second end that is in fluid communication with the outlet conduit at a location that is downstream of the fourth valve opening in the sampling mode of operation;
   wherein in the sampling mode of operation, the first and second valves are open to divert the incoming non-homogenous fluid to the sampling conduit and in the normal mode of operation, the first and second valves are closed.

13. The multi-phase sampling collection system of claim 12, wherein an outlet between the collection drum and the sample container includes a manual sampling valve that is downstream of the first end of the return line.

14. The multi-phase sampling collection system of claim 9, further including a first return line for delivering any separated gases from the inline separator back to the outlet conduit at a location that is downstream of the fourth valve opening when the three-way four-port valve unit is in a sampling mode of operation in which the third valve opening of the main valve body is aligned with the first port of the valve housing; the fourth valve opening is aligned with the second port of the valve housing and one of the first and second valve openings is aligned with the third port of the valve housing.

15. The multi-phase sampling collection system of claim 9, further including a cooling device for cooling the mixed homogenous fluid prior to delivery to the sample container.

16. The multi-phase sampling collection system of claim 15, wherein the cooling device comprises a water cooler, the inline separator comprises an inline cyclone separator and the sample container comprises a pressurized vessel.

17. The multi-phase sampling collection system of claim 9, wherein a diameter of the inlet conduit and a diameter of the outlet conduit are the same as diameters of the first valve opening and the second valve opening.

18. A method of collecting a sample from a non-homogenous fluid that is flowing through a pipeline comprising steps of:
   delivering the non-homogenous fluid to a three-way four-port valve unit that comprises:
      a valve housing and an inner valve member that is movably disposed within the valve housing between a plurality of positions, the inner valve member having a main valve body that has a first valve opening, a second valve opening opposite the first valve opening, a third valve opening and a fourth valve opening opposite the third valve opening; wherein the non-homogenous fluid flows into the third valve opening which is defined by a plurality of orifices that cause mixing of the non-homogenous fluid to generate a mixed homogenous fluid and the fourth valve opening has a lesser diameter that the third valve opening for increasing fluid pressure drop, fluid velocity, and fluid turbulence resulting in improved mixing of the non-homogenous fluid that exits through the fourth valve opening;
   taking a sample of the mixed homogeneous fluid; and
   reinjecting sampling waste back into the pipeline.

19. The method of claim 18, wherein the sampling waste comprises gasses separated from the mixed homogenous fluid.

20. The method of claim 18, further including an advanced process control unit that is operatively coupled to the inner valve member and a plurality of valves for automated control over the inner valve member and the plurality of valves to effectuate automated sampling.

* * * * *